(12) United States Patent
Zeng et al.

(10) Patent No.: US 12,074,315 B2
(45) Date of Patent: Aug. 27, 2024

(54) POSITIVE-ELECTRODE PLATE, LITHIUM-ION BATTERY EQUIPPED WITH THE POSITIVE-ELECTRODE PLATE, BATTERY MODULE, BATTERY PACK, AND APPARATUS

(71) Applicant: Contemporary Amperex Technology Co., Limited, Ningde (CN)

(72) Inventors: Yuqun Zeng, Ningde (CN); Chengdu Liang, Ningde (CN); Changliang Sheng, Ningde (CN); Huafeng Huang, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 914 days.

(21) Appl. No.: 17/057,062
(22) PCT Filed: Sep. 26, 2019
(86) PCT No.: PCT/CN2019/108134
§ 371 (c)(1),
(2) Date: Nov. 19, 2020
(87) PCT Pub. No.: WO2020/063740
PCT Pub. Date: Apr. 2, 2020

(65) Prior Publication Data
US 2021/0210749 A1   Jul. 8, 2021

(30) Foreign Application Priority Data
Sep. 29, 2018   (CN) .......................... 201811151916.1

(51) Int. Cl.
*H01M 4/36*   (2006.01)
*C01G 53/00*   (2006.01)
(Continued)

(52) U.S. Cl.
CPC ............ *H01M 4/366* (2013.01); *C01G 53/50* (2013.01); *H01M 4/131* (2013.01);
(Continued)

(58) Field of Classification Search
CPC .... H01M 4/366; H01M 4/131; H01M 4/1315; H01M 4/505; H01M 4/525; H01M 4/62
See application file for complete search history.

(56) References Cited

U.S. PATENT DOCUMENTS

2010/0273045 A1* 10/2010 Hasegawa ........... H01M 50/446
429/163
2012/0077082 A1   3/2012 Se-Hee et al.
(Continued)

FOREIGN PATENT DOCUMENTS

| CN | 101414676 A | 4/2009 |
|---|---|---|
| CN | 101911368 A | 12/2010 |

(Continued)

OTHER PUBLICATIONS

Merriam-Webster definition of lamella, https://www.merriam-webster.com/dictionary/lamellae, accessed Feb. 9, 2024. (Year: 2024).*
(Continued)

*Primary Examiner* — Jonathan G Jelsma
(74) *Attorney, Agent, or Firm* — East IP P.C.

(57) ABSTRACT

This application discloses a positive-electrode plate, a lithium-ion battery equipped with the positive-electrode plate, a battery module, a battery pack, and an apparatus. The lithium-ion battery includes a positive-electrode plate, a negative-electrode plate, a separator, and an electrolyte. The positive-electrode plate includes a positive-electrode current collector and a positive-electrode active substance layer that is disposed on a surface of the positive-electrode current collector and that includes a positive-electrode active substance. An inorganic dielectric layer containing no binder is disposed on a surface of the positive-electrode active substance layer, and a resistance of the positive-electrode plate is not higher than 8 ohms.

18 Claims, 4 Drawing Sheets

(51) Int. Cl.
  *H01M 4/131*     (2010.01)
  *H01M 4/1315*    (2010.01)
  *H01M 4/505*     (2010.01)
  *H01M 4/525*     (2010.01)
  *H01M 4/62*      (2006.01)
  *H01M 10/0525*   (2010.01)
  *H01M 4/02*      (2006.01)

(52) U.S. Cl.
  CPC ......... *H01M 4/1315* (2013.01); *H01M 4/505* (2013.01); *H01M 4/525* (2013.01); *H01M 4/62* (2013.01); *H01M 10/0525* (2013.01); *H01M 2004/021* (2013.01); *H01M 2004/028* (2013.01); *H01M 2220/20* (2013.01)

(56) References Cited

U.S. PATENT DOCUMENTS

| | | | |
|---|---|---|---|
| 2013/0130107 A1 | 5/2013 | Uchida | |
| 2018/0241021 A1* | 8/2018 | Kim | H01M 50/204 |
| 2020/0006750 A1* | 1/2020 | Zhang | H01M 4/80 |

FOREIGN PATENT DOCUMENTS

| | | | | | |
|---|---|---|---|---|---|
| CN | 102420300 A | 4/2012 | | | |
| CN | 103413966 A | 11/2013 | | | |
| CN | 103682247 A | 3/2014 | | | |
| CN | 104064705 A | 9/2014 | | | |
| CN | 105977449 A | 9/2016 | | | |
| CN | 106229447 A | 12/2016 | | | |
| CN | 107749457 A | 3/2018 | | | |
| CN | 108807974 A | * | 11/2018 | ........ | H01M 10/0525 |
| CN | 109950470 A | 6/2019 | | | |
| EP | 3506397 A1 | 7/2019 | | | |

OTHER PUBLICATIONS

International Search Report for PCT/CN2019/108134 dated Jan. 2, 2020, 10 pages.
The First Office Action and search report dated Aug. 26, 2020 for Chinese Application No. 201811151916.1,9 pages.
The Second Office Action and search report dated Nov. 13, 2020 for Chinese Application No. 201811151916.1,8 pages.
The First Examination Report for EP Application No. 19866720.6, dated Feb. 15, 2022, 5 pages.
The Third Office Action for CN Application No. 201811151916.1, dated Feb. 4, 2021, 6 pages.
The extended European search report for EP Application No. 19866720.6 daetd Jul. 9, 2021, 9 pages.

* cited by examiner

POSITIVE-ELECTRODE PLATE, LITHIUM-ION BATTERY EQUIPPED WITH THE POSITIVE-ELECTRODE PLATE, BATTERY MODULE, BATTERY PACK, AND APPARATUS

CROSS-REFERENCE TO RELATED APPLICATION

This application is a National Stage of International Application No. PCT/CN2019/108134, filed on Sep. 26, 2019, which claims priority to Chinese Patent Application No. 201811151916.1, filed on Sep. 29, 2018, both of which are incorporated herein by reference in their entireties.

TECHNICAL FIELD

This application relates to a positive-electrode plate, a lithium-ion battery equipped with the positive-electrode plate, a battery module, a battery pack, and an apparatus.

BACKGROUND

Lithium-ion batteries have a broad application prospect in the field of electric vehicles due to characteristics such as a high energy density, a long cycle life, and no pollution. To meet requirements of consumers for a driving range of electric vehicles, one effective method is to develop a positive-electrode active substance that has a high specific capacity.

Currently, a lithium nickel-cobalt-manganese ternary material has become a hot topic of research due to relatively high theoretical specific capacity and safety features. However, a high content of nickel metal in the lithium nickel-cobalt-manganese ternary material imparts strong oxidizing property to the material, and makes an electrolyte vulnerable to electrochemical oxidation reactions on a surface of a positive electrode. In addition, the high content of the nickel metal may also cause a structural change of the lithium nickel-cobalt-manganese ternary material, cause release of transition metals such as nickel and cobalt due to a reduction reaction of the metals, and cause deteriorated electrochemical performance, especially high-temperature performance, of the lithium-ion battery. Furthermore, in a process for preparing the lithium nickel-cobalt-manganese ternary material, excessive lithium salts may be added to make up for a lithium loss caused in a sintering process. In this way, a small amount of Li residues exist on a surface of the prepared positive-electrode active substance, and may exist in the form of $Li_2O$ at a high temperature. After the temperature drops to a room temperature, the $Li_2O$ may adsorb $CO_2$ and $H_2O$ in the air to form residual lithium such as $LiOH$ and $Li_2CO_3$. The residual lithium may aggravate gas generation in the lithium-ion battery, and deteriorate storage performance. The lithium nickel-cobalt-manganese ternary material is generally in the form of secondary particles formed by agglomerating primary particles, and is poor in compressive strength. Once crushed, the positive-electrode active substance has a significantly increased specific surface area, resulting in an increased contact area with the electrolyte and further deteriorating the gas generation problem of the lithium-ion battery.

The application of electric vehicles requires the lithium-ion battery to have a long cycle life and a long storage life. The long cycle life and the long storage life are intended to achieve a longer driving range of the battery. In addition, the lithium-ion battery is required to have stable acceleration performance and power performance. This requires the lithium-ion battery to have a low internal resistance during long-term cycling and storage.

SUMMARY

Considering the problems in the background, an objective of this application is to disclose a positive-electrode plate, a lithium-ion secondary battery equipped with the positive-electrode plate, a battery module, a battery pack, and an apparatus. The lithium-ion secondary battery in this application has relatively low gas generation, and a longer cycle life and a longer storage life, and significantly suppresses growth of a direct-current internal resistance of the lithium-ion battery during cycling and storage.

To achieve the above objective, according to a first aspect of this application, this application provides a positive-electrode plate, including a positive-electrode current collector and at least one positive-electrode active substance layer disposed on a surface of the positive-electrode current collector. The positive-electrode active substance layer includes a positive-electrode active substance represented by Formula (1):

$$Li_xNi_yCo_zM_kMe_pO_rA_m \qquad \text{Formula (1)}.$$

In the Formula, 0.95≤x≤1.05, 0≤y≤1, 0≤z≤1, 0≤k≤1, 0≤p≤0.1, y+z+k+p=1, 1≤r≤2, 0≤m≤2, m+r≤2, M is one or two of Mn or Al, Me is one or more of Zr, Zn, Cu, Cr, Mg. Fe, V, Ti, Y, or Nb, and A is one or more of N, F. S, or Cl. An inorganic dielectric layer containing no binder is disposed on a surface of the at least one positive-electrode active substance layer that is away from the current collector, and a resistance R of the positive-electrode plate is not higher than 8 ohms.

According to a second aspect of this application, this application provides a lithium-ion battery, including the positive-electrode plate according to the first aspect of this application, a negative electrode plate, a separator, and an electrolyte. The separator is disposed between the positive-electrode plate and the negative-electrode plate.

According to a third aspect of this application, this application provides a battery module, including the lithium-ion battery disclosed in the second aspect of this application.

According to a fourth aspect of this application, this application provides a battery pack, including the battery module according to the third aspect of this application.

According to a fifth aspect of this application, this application provides an apparatus, including the lithium-ion battery according to the second aspect of this application. The lithium-ion battery is used as a power supply of the apparatus.

Preferably, the apparatus includes a pure electric vehicle, a hybrid electric vehicle, a plug-in hybrid electric vehicle, an electric bicycle, an electric scooter, an electric golf cart, an electric truck, or an energy storage system.

Compared with the prior art, this application achieves at least the following beneficial effects:

An inorganic dielectric layer containing no binder is disposed on a surface of the positive-electrode plate in this application. Due to a good chemical stability, the inorganic dielectric layer may be stable under a high voltage. On the one hand, this slows down the structural change on the surface of the active substance of a high-capacity positive-electrode active substance caused by a too high voltage, and improves stability and long-term reliability of the positive-electrode material. On another hand, the inorganic dielectric layer can effectively suppress side reactions on the surface of the positive-electrode plate in the electrolyte, and prevent a highly oxidative positive-electrode active substance from directly contacting the separator, thereby reducing the gas generation in the lithium-ion battery and preventing a separator polymer from oxidation and failure under a high voltage. In addition, as a dielectric material, the substance in the inorganic layer achieves performance of electronic insulation and ion conduction to some extent. Lower internal resistance, less polarization, and better cycling performance and better rating performance of the battery are advantageously ensured by controlling the resistance of the positive-electrode plate to be not higher than 8 ohms.

The battery module, the battery pack, and the apparatus in this application include the lithium-ion battery, and therefore, have at least the same advantages as those in the lithium-ion battery:

REFERENCE NUMERALS

1: Battery pack:
  2: Upper container part;
  3: Lower container part;
  4: Battery module;
    5: Battery;
      51: Casing:
      52: Electrode assembly:
        521: Positive-electrode plate:
        521a: Positive-electrode current collector:
        521b: Positive-electrode active substance layer:
        521c: Inorganic dielectric layer; and
      53: Top cover assembly.

DESCRIPTION OF EMBODIMENTS

To make the objectives, technical solutions, and advantages of this application clearer, the following describes this application in further detail with reference to accompanying drawings and embodiments. Understandably, specific implementations described herein are merely intended to explain this application, but are not intended to limit this application.

In the context of this application, unless otherwise expressly specified, the term "multiple" or "a plurality of" means two or more. Unless otherwise expressly specified, the term "connect" shall be understood broadly. For example, a "connection" may be a fixed connection, or a detachable connection, or an integrated connection, or an electrical connection, or a signal connection. The term "connection" or "connected" may means being directly connected or indirectly connected through an intermediate medium. A person of ordinary skill in the art can understand the specific meanings of the terms in this application according to the context.

Understandably, in the context of this application, the words of direction such as "on". "above", "under", and "below" described in the embodiments of this application are described from a perspective shown in the drawings, and shall not be understood as a limitation on the embodiments of this application. The following describes this application in further detail with reference to specific embodiments and accompanying drawings.

The following describes in detail a positive-electrode plate, a lithium-ion battery, a battery module, a battery pack, and an apparatus according to this application.

First, according to a first aspect of this application, a positive-electrode plate is disclosed, including a positive-electrode current collector and at least one positive-electrode active substance layer disposed on a surface of the positive-electrode current collector. The positive-electrode active substance layer includes a positive-electrode active substance represented by Formula (1):

$$Li_xNi_yCo_zM_kMe_pO_rA_m \qquad \text{Formula (1).}$$

In the Formula, $0.95 \leq x \leq 1.05$, $0 \leq y \leq 1$, $0 \leq z \leq 1$, $0 \leq k \leq 1$, $0 \leq p \leq 0,1$, $y+z+k+p=1$, $1 \leq r \leq 2$, $0 \leq m \leq 2$, $m+r \leq 2$, M is one or two of Mn or Al, Me is one or more of Zr, Zn, Cu, Cr, Mg, Fe, V, Ti, Y, or Nb, and A is one or more of N, F. S, or Cl. An inorganic dielectric layer is disposed on a surface of the at least one positive-electrode active substance layer that is away from the current collector, and the inorganic dielectric layer includes no binder. A resistance R of the positive-electrode plate is not higher than 8 ohms.

Figure 1:
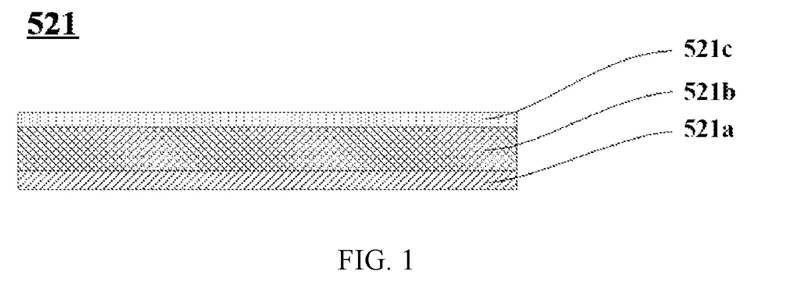
FIG. 1 is a schematic structural diagram of a specific positive-electrode plate according to an embodiment of this application.
Figure 2:
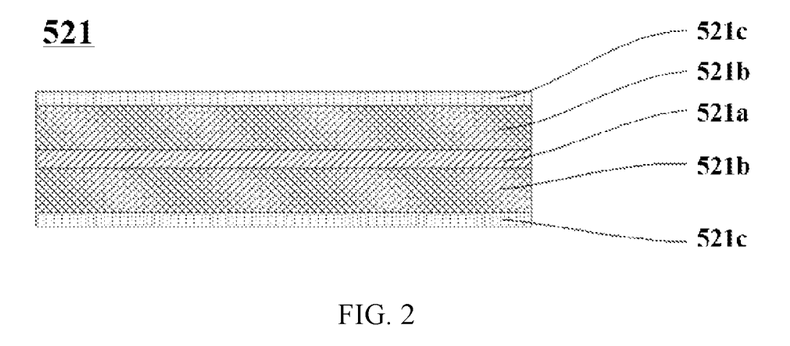
FIG. 2 is a schematic structural diagram of another specific positive-electrode plate according to an embodiment of this application.
Figure 3:
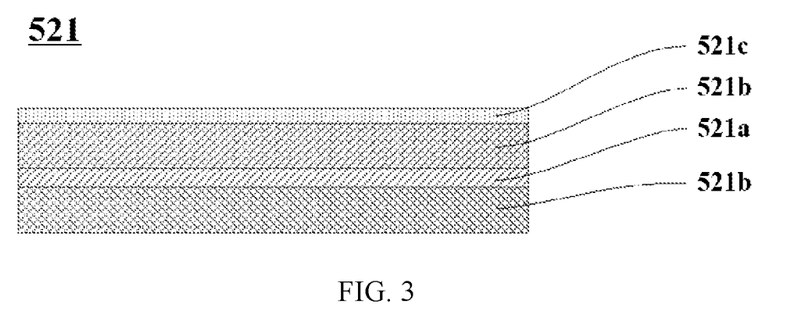
FIG. 3 is a schematic structural diagram of another specific positive-electrode plate according to an embodiment of this application.

FIG. 1 to FIG. 3 are schematic structural diagrams of a positive-electrode plate according to an embodiment of this application. In FIG. 1, a positive-electrode active substance layer 521b is disposed on one surface of a positive-electrode current collector 521a, and an inorganic dielectric layer 521c is disposed on a surface of the positive-electrode active substance layer 521b. In FIG. 2 and FIG. 3, the positive-electrode active substance layers 521b are disposed on both surfaces of the positive-electrode current collector 521a. In the positive-electrode plate shown in FIG. 2, the inorganic dielectric layers 521c are disposed on surfaces of the two positive-electrode active substance layers 521b. In the positive-electrode plate shown in FIG. 3, the inorganic dielectric layer 521c is disposed on only one positive-electrode active substance layer 521b.

In the positive-electrode plate according to the first aspect of this application, a positive-electrode active substance is a ternary positive-electrode material that has a high specific capacity per gram but strong oxidizing property. The inorganic dielectric layer containing no binder disposed on the surface of the positive-electrode active substance layer can effectively stabilize the structure of an active substance on the surface of the positive-electrode plate and avoid the release of transition metal ions. In addition, the inorganic dielectric layer is mainly disposed on the surface of the positive-electrode plate. Due to electrochemical stability, the inorganic dielectric layer reduces an area of direct contact between positive-electrode active substance particles and an electrolyte, reduces side reactions of the electrolyte on the surface of the positive-electrode plate, and effectively mitigates the storage gas generation problem of the lithium-ion battery:

No binder is applied for the purpose of fixing between the inorganic dielectric layer and the positive-electrode active substance layer, thereby avoiding electrical performance deterioration and safety problems caused by detachment of the inorganic dielectric layer due to non-uniform distribution of a binder or failure of a binder soaked in electrolyte, or in a long-term cycling process or in the case of mechanical abuse. In addition, the inorganic dielectric layer closely coats active particles on the surface of the positive-electrode active substance layer, and therefore, can reduce a probability of crushing of the particles of the positive-electrode active substance during cycling, and enhance overall mechanical strength of the positive-electrode active substance layer against crushing. In addition, the inorganic dielectric layer can also form a chemically stable insulating interface between the highly oxidative positive-electrode plate and the separator, and avoid oxidation and failure caused by contact between a superficial polymer of the separator and the highly oxidative positive-electrode active substance layer.

The inorganic dielectric layer on the surface of the positive-electrode active substance layer in this application is an inorganic dielectric material, and therefore, may increase the resistance of the positive-electrode plate. In a battery system, the resistance of the positive-electrode plate accounts for approximately 80% of an internal resistance of the battery. Therefore, too high internal resistance affects energy output, battery life, and safety performance of the battery. In this application, the resistance of the positive-electrode plate comprising the inorganic dielectric layer is controlled to be not higher than 8 ohms. This prevents excessive increase of the internal resistance of the battery system while increasing stability and safety performance of the battery system, and achieves good kinetic performance and good rating performance of the battery.

The resistance R of the positive-electrode plate is a resistance of the positive-electrode plate measured by using a direct-current two-probe method when an area of contact between a probe and the positive-electrode plate is $49\pi mm^2$. For example, an upper side and a lower side of the positive-electrode plate are clamped between two conductive terminals of an electrode plate resistance tester, and are fixed by applying a pressure. The resistance R of the positive-electrode plate is measured. A diameter of each of the conductive terminals is 14 mm, and the applied pressure is 15 MPa~27 MPa. The electrode plate resistance tester is, for example, a Hioki BT3562 internal resistance tester.

In the positive-electrode plate according to the first aspect of this application, the inorganic dielectric layer may be formed by vapor deposition or electrochemical deposition. Preferably, the inorganic dielectric layer is formed by vapor deposition. The vapor deposition may be chemical vapor deposition, physical vapor deposition, or plasma vapor deposition. The inorganic dielectric layer formed by vapor deposition has a stronger bonding force to bond with the positive-electrode active substance layer, and can prevent the inorganic dielectric layer from detaching from the surface of the positive-electrode active substance layer in a long-term cycling process or in the case of mechanical abuse of the battery.

In the positive-electrode plate according to the first aspect of this application, and preferably, in the positive-electrode active substance represented by Formula (1), $0.50 \leq y \leq 0.95$, $0 \leq z \leq 0.2$, $0 \leq k \leq 0.2$, $0 \leq p \leq 0.05$, and $y+z+k+p=1$. Further preferably, a substrate of the positive-electrode active substance may be one or more of $LiNi_{0.8}Co_{0.1}Mn_{0.1}O_2$, $LiNi_{0.70}Co_{0.15}Mn_{0.15}O_2$, $LiNi_{0.95}Co_{0.02}Mn_{0.03}O_2$, $LiNi_{0.8}Co_{0.1}Al_{0.1}O_2$, $LiNi_{0.70}Co_{0.15}Mn_{0.15}O_{1.8}F_{0.2}$, $LiNi_{0.8}Co_{0.1}Mn_{0.08}Zr_{0.02}O_2$, or $LiNi_{0.75}Co_{0.15}Mn_{0.05}Nb_{0.05}O_2$.

In the positive-electrode plate according to the first aspect of this application, the positive-electrode active substance layer further includes a positive-electrode active substance represented by Formula (2):

$$Li_{1+z}Mn_cMe'_{2-c}O_{4-d}A'_d \qquad \text{Formula (2)}$$

where $-0.1 \leq z \leq 0.2$, $0 < c \leq 2$, $0 \leq d < 1$, Me' includes one or more of Ni, Fe, Cr, Ti, Zn, V, Al, Mg, Zr, or Ce, and A' includes one or more of S, N, F, Cl, Br, or I.

The positive-electrode active substance represented by Formula (2) is of a spinel structure. Compared with the compound represented by Formula (1), the positive-electrode active substance represented by Formula (2) is of high structural stability at a high temperature and under a high voltage. Therefore, with a certain amount of the compound of Formula (2) mixed in the positive-electrode active substance layer, the area of contact between the electrolyte and the compound in Formula (1) inside the electrode plate can be reduced, thereby further mitigating the gas generation problem of a high-capacity battery and improving the cycling stability of the battery:

In the positive-electrode plate according to the first aspect of this application, the inorganic dielectric layer is formed of a plurality of nanoclusters that are closely stacked via intermolecular force. A nanocluster is a type of nano-scale ultra-fine particle. Several or hundreds of atoms and molecules are agglomerated together to form a nano-scale ultra-fine particle. The ultra-fine particle is referred to as a nano-cluster. A distribution form of the inorganic dielectric layer on the surface of the electrode plate and a membrane structure of the inorganic dielectric layer are closely related to a manufacturing method and technical parameters of the inorganic dielectric layer. The applicant of this application finds that when the inorganic dielectric layer is formed of a plurality of nanoclusters that are closely stacked via intermolecular force, the membrane has a higher density and more stable electrochemical properties, and may be stable under a high voltage.

Preferably, an average particle diameter $D_1$ of the nanoclusters and a thickness T of the inorganic dielectric layer covering a surface of the positive-electrode active substance layer satisfy: $0.02*T \leq D_1 \leq T$. In this way, requirements on adhesion, uniformity, and specific mechanical strength of the nanocluster are satisfied, and it is ensured that the inorganic layer is highly stable against oxidation and high voltage. In addition, it is ensured that the inorganic layer has high permeability, wettability by the electrolyte, and high ion transmittance, and that both battery cell and electrode plate have good kinetic performance.

In the positive-electrode plate according to the first aspect of this application, an average particle diameter of the nanoclusters is 5 nm~200 nm. A lower limit of the average particle diameter of the nanoclusters may be 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm. An upper limit of the average particle diameter of the nanoclusters may be 110 nm, 120 nm, 130 nm, 140 nm, 150 nm, 160 nm, 170 nm, 180 nm, 190 nm, or 200 nm. The average particle diameter of the nanoclusters may be any value from the upper limit to the lower limit.

In the positive-electrode plate according to the first aspect of this application, the thickness T of the inorganic dielectric layer is 50 nm~1000 nm. An upper limit of the thickness of the inorganic dielectric layer may be 1000 nm, 990 nm, 950 nm, 900 nm, 850 nm, 800 nm, 750 nm, 720 nm, 700 nm, 680 nm, 650 nm, 600 nm, 550 nm, 500 nm, 490 nm, 450 nm, 430 nm, 400 nm, 380 nm, 350 nm, 300 nm, 280 nm, 250 nm, or 200 nm. A lower limit of the thickness of the inorganic dielectric layer may be 50 nm, 55 nm, 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, or 190 nm. The thickness of the inorganic dielectric layer may be any value from the upper limit to the lower limit. In the case that the inorganic dielectric layer is too thin, an interface between the positive-electrode plate and the electrolyte as well as an interface between the positive-electrode plate and the separator cannot be effectively stabilized. In the case that the inorganic dielectric layer is too thick, the resistance of the positive-electrode plate may sharply increase on another hand, and a dense membrane may be formed on the surface of the positive-electrode plate on another hand, thereby affecting the cycling performance and kinetic performance of the battery, increasing the thickness of the electrode plate, and reducing an energy density of the battery.

Preferably, the thickness T of the inorganic dielectric layer is 100 nm~600 nm. Further preferably, the thickness of the inorganic dielectric layer is 200 nm~500 nm. Within the above ranges, the highly oxidative surface of the positive-electrode plate is effectively protected, so the surface of the separator and the electrolyte will not be easily oxidized, thereby inhibiting the increase of the thickness and the mass of the battery, and advantageously improving mass energy density and bulk energy density of the battery.

In the positive-electrode plate according to the first aspect of this application, the inorganic dielectric layer covers, in the form of discrete lamellae, an outermost surface of the positive-electrode active substance layer and inner walls of at least a part of pores inside the positive-electrode active substance layer. In an embodiment of this application, when prepared in a vapor phase method, the inorganic dielectric layer can be deposited not only on the surface of the positive-electrode active substance layer, but also on inner walls of pores between active substance particles that exist at a specific depth of the surface of the positive-electrode plate. After being cold calendered, the inorganic dielectric layer on the surface of the electrode plate exhibits the form of discrete lamellae. On the one hand, such a structure can, by taking advantage of high dielectric constant and hydrophilicity of the inorganic material, form an electrochemically stable protective layer on the surface of the positive-electrode plate to increase a speed of wetting the electrode plate in the electrolyte. In addition, the inorganic dielectric layer is distributed so discretely that the inorganic dielectric layer is not too dense, thereby avoiding too low porosity on the surface of the electrode plate and a decrease of ion channels, and thus inhibiting local deterioration of cycling performance and kinetic performance of the battery cell.

Preferably: the thickness of the inorganic dielectric layer covering the inner walls of the pores inside the positive-electrode active substance layer gradually decreases from the outermost to the inside in a thickness direction of the positive-electrode active substance layer. In this embodiment of this application, in the case of using a vapor phase method, as the thickness of the inorganic dielectric layer increases, a deposition thickness of the inorganic dielectric layer deposited in the pores between the particles inside the active substance layer gradually decreases in the thickness direction of the positive-electrode active substance layer. Inside the electrode plate, the pore diameter is relatively large, and the porosity is relatively high. On an outer layer of the electrode plate, the pore diameter and the porosity decrease. Such a structure improves wetting of the electrode plate in the electrolyte and increases an electrolyte retention rate, more effectively suppresses side reactions of the electrolyte on the surfaces of the positive-electrode plate and the internal active substance, effectively mitigates the gas generation problem of the battery cell, and improves safety performance of the battery cell.

In the positive-electrode plate according to the first aspect of this application, a depth by which the inorganic dielectric layer extends in the thickness direction of the positive-electrode active substance layer is $1/1000$ to $1/10$ of the thickness of the positive-electrode active substance layer. In a specific manufacturing process, for example, in the case of using a vapor deposition method, the depth by which the inorganic dielectric layer extends inside the positive-electrode active substance layer gradually increases with the increase of the deposition thickness. In the case that the depth by which the inorganic dielectric layer extends inside the positive-electrode active substance layer falls within the above range, it is ensured that some pores exist on the surface of and inside the active substance layer, the electrode plate is well wetted by the electrolyte, and performs well in conducting ions.

In the positive-electrode plate according to the first aspect of this application, the inorganic dielectric layer may be at least one of aluminum oxides. AlO (OH), aluminum nitrides, aluminum fluorides, silicon oxides, silicon nitrides, silicon fluorides, titanium oxides, titanium nitrides, titanium fluorides, zinc oxides, zinc nitrides, zinc fluorides, magnesium oxides, magnesium nitrides, magnesium fluorides, zirconium oxides, zirconium nitrides, zirconium fluorides, calcium oxides, calcium nitrides, calcium fluorides, barium oxides, barium nitrides, or barium fluorides.

In the positive-electrode plate according to the first aspect of this application, a compacted density of the positive-electrode plate is 3.2 g/cm$^3$~3.9 g/cm$^3$, and a porosity of the positive-electrode plate is 2%~30%. In this application, in the case that the compacted density and the porosity of the positive-electrode plate fall within the above ranges, it is ensured that the inorganic dielectric layer on the surface of the electrode plate is formed on the inner walls of the pores between some particles on the surface of and inside the electrode plate, and the pores of the electrode plate will not be blocked due to not too thick inorganic dielectric layer. In the case that the compacted density of the positive-electrode plate is too low (less than 3.2 g/cm$^3$) or the porosity is too high (greater than 30%), the pores on the surface of and inside the electrode plate are too large and too many. Consequently, the inorganic dielectric layer goes too deep into the electrode plate, and a good chemical passivation layer cannot be formed on the surface of the electrode plate to suppress oxidative decomposition of the electrolyte and the separator. In the case that the compacted density of the electrode plate is too high (greater than 3.9 g/cm$^3$) or the porosity is too low (less than 2%), the inorganic dielectric layer is almost all distributed on the surface of the electrode plate, and almost does not cover any particles inside the electrode plate. Consequently, superficial pores are likely to be blocked, and the ion conduction performance is reduced.

In the positive-electrode plate according to the first aspect of this application, the particle diameter D50 of the substrate of the positive-electrode active substance may be 5 μm~25

μm, and further preferably, the particle diameter D50 of the substrate of the positive-electrode active substance may be 8 μm~18 μm.

In the positive-electrode plate according to the first aspect of this application, a specific surface area of the positive-electrode active substance is 0.3 m$^2$/g~0.8 m$^2$/g.

In the positive-electrode plate according to the first aspect of this application. The positive-electrode active substance layer further includes a binder and a conductive agent. Specific types of the binder and the conductive agent are not limited, and may be selected according to needs. Preferably, the binder may be one or more of polyvinylidene fluoride (PVDF), polytetrafluoroethylene, vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, or fluorinated acrylate resin. Preferably, the conductive agent may be one or more of conductive carbon black, superconducting carbon black, conductive graphite, acetylene black. Ketjen black, graphene, or carbon nanotube.

In the positive-electrode plate according to the first aspect of this application. The specific type of the positive-electrode current collector is not limited, and may be selected according to needs. Preferably, the positive-electrode current collector may be an aluminum foil.

Next, the lithium-ion battery according to a second aspect of this application will be described, wherein the lithium-ion battery comprises the positive-electrode plate according to the first aspect of this application, a negative electrode plate, a separator, and an electrolyte. The separator is disposed between the positive-electrode plate and the negative-electrode plate.

Figure 4:
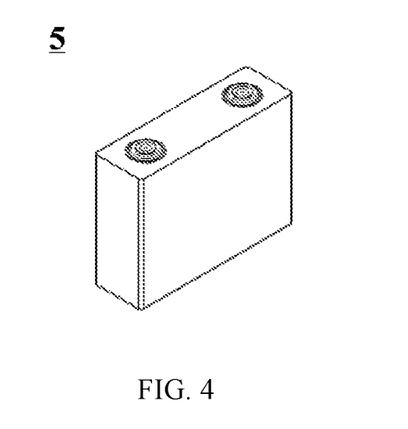
FIG. 4 is a three-dimensional view of an implementation of a lithium-ion battery.
Figure 5:
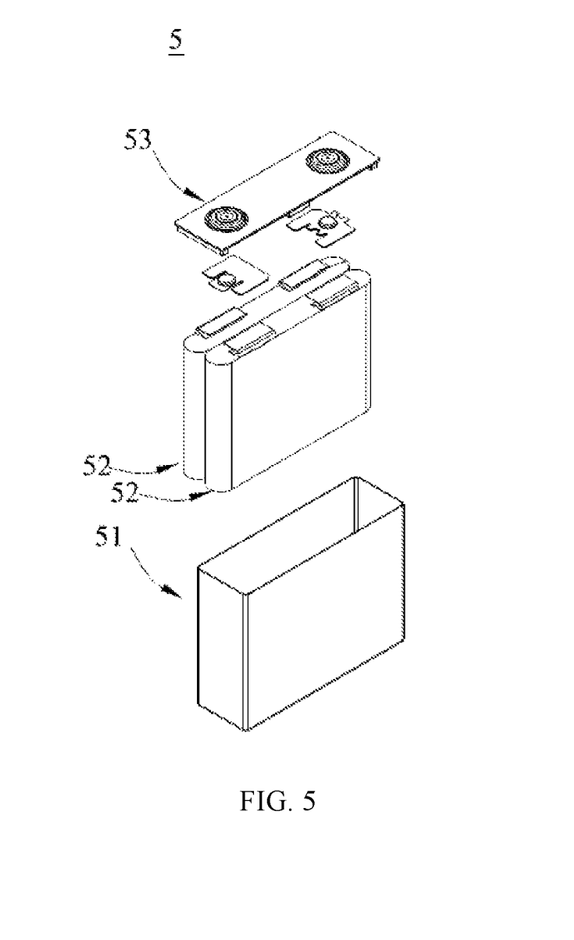
FIG. 5 is an exploded view of FIG. 4.

FIG. 4 is a three-dimensional view of an implementation of a lithium-ion battery 5. FIG. 5 is an exploded view of FIG. 4. Referring to FIG. 4 to FIG. 5, the lithium-ion battery 5 includes a casing 51, an electrode assembly 52, and a top cover assembly 53. The electrode assembly 52 is accommodated in the casing 51. The electrode assembly 52 includes a positive-electrode plate 521, a negative-electrode plate, and a separator. The separator separates the positive-electrode plate 521 from the negative-electrode plate. The electrolyte is injected into the casing 51 and soaks the electrode assembly 51, and specifically soaks the positive-electrode plate 521, the negative electrode plate, and the separator. In the lithium-ion battery 5, the quantity of electrode assemblies 52 is not limited, and may be one or more.

It is noted that the battery shown in FIG. 4 is a can-shaped battery, but the battery in this application is not limited to a can-shaped battery. The lithium-ion battery 5 may be a pouch-shaped battery: That is, the casing 51 is replaced with a metal laminated film, and the top cover assembly 53 is removed.

In the lithium-ion battery according to the second aspect of this application, the negative-electrode plate includes a negative-electrode current collector and a negative-electrode active substance layer. The negative-electrode active substance layer may be disposed on one surface of the negative-electrode current collector, or may be disposed on two surfaces of the negative-electrode current collector. The negative-electrode active substance may be one or more of metal lithium, a carbon-based negative-electrode material, a silicon-based material, a tin-based material, or lithium titanate. Preferably, the carbon-based negative-electrode material may be one or more of natural graphite, artificial graphite, mesocarbon microbead (MCMB), hard carbon, soft-carbon nanocarbon, or carbon fiber. The silicon-based material may be one or more of silicon, a silicon-carbon composite, or a silicon-oxygen compound. The tin-based material may be one or more of elemental tin, a tin-oxygen compound, a tin-carbon composite, or a tin alloy.

Preferably, a second inorganic layer containing no binder is disposed on the surface of the negative-electrode plate, and a resistance of the negative-electrode plate is not higher than 3 ohms. The second inorganic layer has substantially the same properties as the inorganic dielectric layer disposed on the surface of the positive-electrode active substance layer. The above configuration can further optimize interfaces of a negative-electrode plate of the lithium-ion battery without greatly increasing the negative-electrode resistance, and effectively stabilize cycling performance and storage performance of a battery system under a high voltage and at a high temperature.

In the lithium-ion battery according to the second aspect of this application, the negative-electrode active substance layer further includes a binder and a conductive agent. Specific types of the binder and the conductive agent are not limited, and may be selected according to needs. Preferably, the binder may be specifically one or more of styrene-butadiene rubber (SBR) or sodium carboxymethyl cellulose (CMC). Preferably, the conductive agent may be one or more of conductive carbon black, superconducting carbon black, conductive graphite, acetylene black. Ketjen black, graphene, or carbon nanotube. In the lithium-ion battery according to this application, the specific type of the negative-electrode current collector is not limited, and may be selected according to needs. Preferably, the negative-electrode current collector may be a copper foil.

In the lithium-ion battery according to the second aspect of this application. A specific composition of the electrolyte is not limited, and may be prepared according to actual needs. Generally the electrolyte includes a lithium salt, an organic solvent, and an optional additive.

In the lithium-ion battery according to the second aspect of this application, the specific type of the organic solvent is not limited, and may be selected according to needs. Preferably, the organic solvent may be at least two of ethylene carbonate (EC), propylene carbonate, butylene carbonate, fluoroethylene carbonate (FEC), ethyl methyl carbonate (EMC), dimethyl carbonate, diethyl carbonate (DEC), dipropyl carbonate, methyl propyl carbonate, ethyl propyl carbonate. 1,4-butyrolactone, methyl propionate, methyl butyrate, ethyl acetate, ethyl propionate, ethyl butyrate, sulfolane, dimethyl sulfone, methyl ethyl sulfone, or diethyl sulfone.

In the lithium-ion battery according to the second aspect of this application, the specific type of the lithium salt is not limited, and may be selected according to needs. The lithium salt may be one or more of LiPF$_6$, LiBF$_4$, LiClO$_4$, LiAsF$_6$, LiFSI, LiTFSI, LiTFS, LiPO$_2$F$_2$, LiDFOB, or LiBOB. Preferably, a concentration of the lithium salt is 0.5 mol/L to 1.5 mol/L; and further preferably, the concentration of the lithium salt is 0.8 mol/L to 1.2 mol/L.

In the lithium-ion battery according to the second aspect of this application, the electrolyte may further include one or more of vinylene carbonate (VC), vinyl ethylene carbonate (VEC). FEC, succinonitrile (SN), adiponitrile (ADN), 1,3-propene sultone (PST), tris(trimethylsilane) phosphate (TMSP), or tris(trimethylsilane) borate (TMSB).

In the lithium-ion battery according to the second aspect of this application, the electrolyte may be prepared using conventional methods, for example, by homogeneously mixing materials in the electrolyte. For example, lithium salt, an additive A, and an additive B are added to an organic solvent and mixed to obtain the electrolyte. Specific order of adding the materials is not limited. For example, the lithium salt may be added into the organic solvent first, and then the additive A and the additive B are simultaneously added into the organic solvent and homogeneously mixed to obtain the electrolyte.

In the lithium-ion battery according to the second aspect of this application, the specific type of the separator is not limited, and may be selected according to needs. For example, the separator may be, but not limited to, polyethylene, polypropylene, or polyvinylidene fluoride, or a multilayer composite film of the polyethylene, the polypropylene, or the polyvinylidene fluoride. The separator may be a bare film made from such materials, or may be a product obtained by coating the bare film. The coating differs depending on use conditions of the separator. For example, the coating may be a ceramic coating or an organic coating.

A third aspect of this application discloses a battery module, including the lithium-ion battery disclosed in the second aspect of this application.

Figure 6:
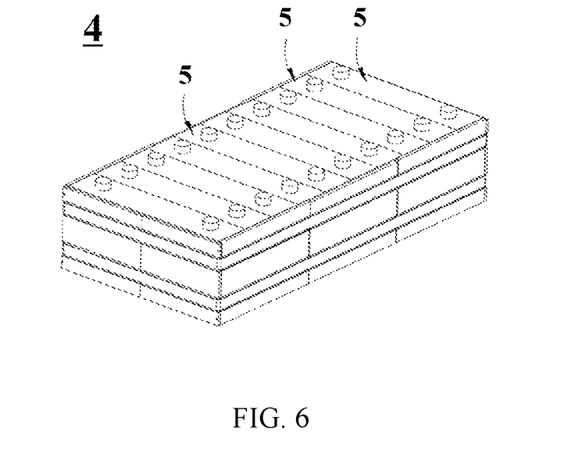
FIG. 6 is a three-dimensional view of an implementation of a battery module.

Further, the quantity of lithium-ion batteries included in the battery module may be adjusted according to the application and capacity of the battery module. FIG. 6 is a three-dimensional view of an implementation of a battery module 4. Referring to FIG. 6, the battery module 4 includes a plurality of lithium-ion batteries 5. The plurality of batteries 5 are arranged in the longitudinal direction.

Figure 7:
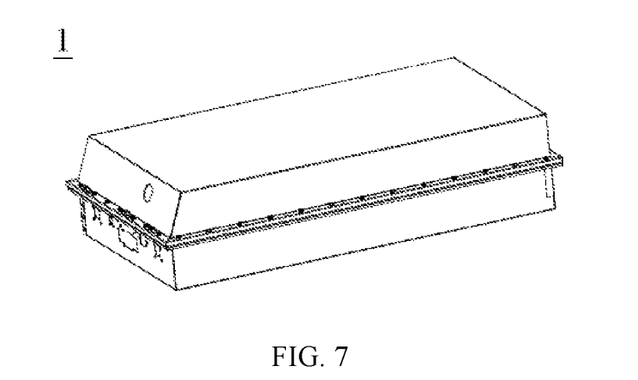
FIG. 7 is a three-dimensional view of an implementation of a battery pack.
Figure 8:
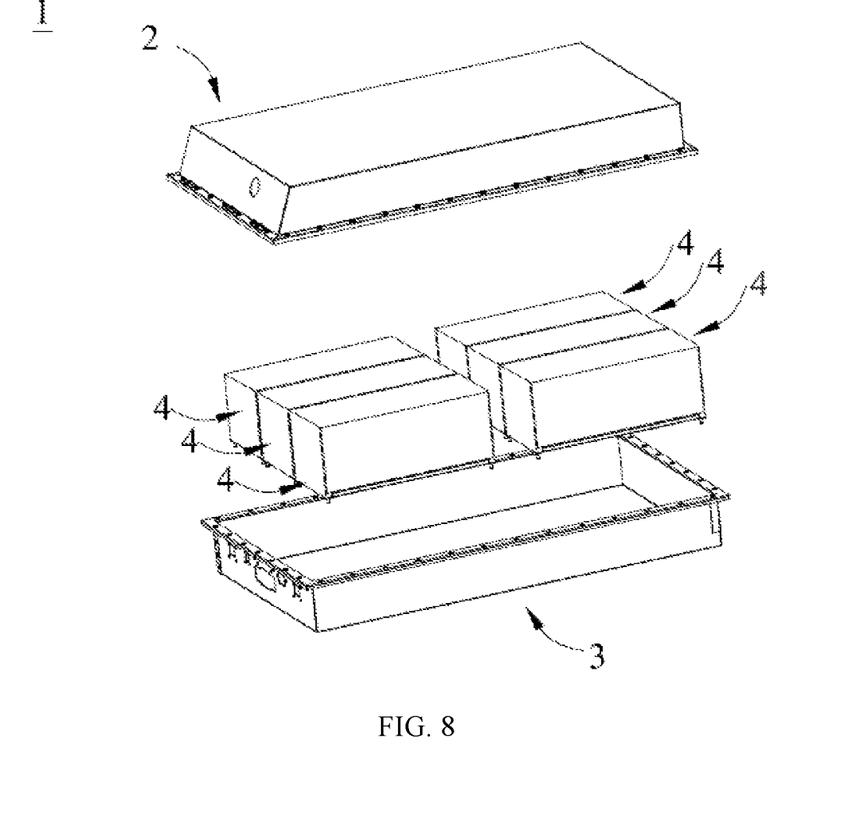
FIG. 8 is an exploded view of FIG. 7.

A fourth aspect of this application discloses a battery pack, including the battery module of the third aspect of this application. FIG. 7 is a three-dimensional view of an implementation of a battery pack 1. FIG. 8 is an exploded view of FIG. 7. Referring to FIG. 7 and FIG. 8, the battery pack 1 includes an upper container part 2, a lower container part 3, and a battery module 4. The upper container part 2 and the lower container part 3 are assembled together to form a space for accommodating the battery module 4. The battery module 4 is fitted into a space formed by assembling the upper container part 2 and the lower container part 3 together. An output electrode of the battery module 4 passes through one of the upper container part 2 or the lower container part 3 or is led out between the upper container part 2 and the lower container part 3, to supply power to the outside or to be charged from the outside. The quantity and arrangement of battery modules 4 may be determined according to actual needs.

According to a fifth aspect of this application, this application provides an apparatus, including the lithium-ion battery disclosed in the second aspect of this application, or the battery module disclosed in the third aspect, or the battery pack disclosed in the fourth aspect. The lithium-ion battery may be used as a power supply of the apparatus.

Figure 9:
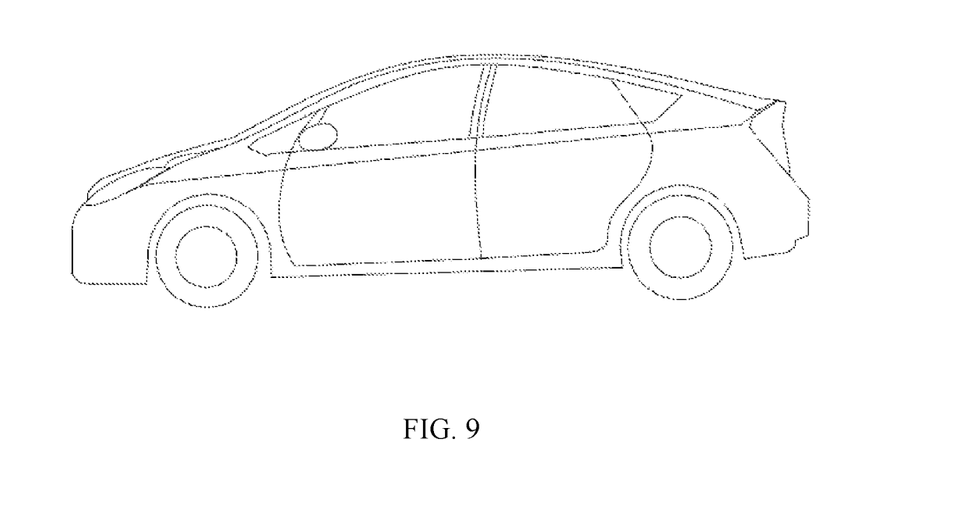
FIG. 9 is a schematic diagram of an implementation of an apparatus using a lithium-ion battery as a power supply.

In some exemplary implementations of this application, the apparatus includes a pure electric vehicle, a hybrid electric vehicle, a plug-in hybrid electric vehicle, an electric bicycle, an electric scooter, an electric golf cart, an electric truck, and an energy storage system. FIG. 9 is a schematic diagram of an implementation of an apparatus using a lithium-ion battery as a power supply.

The battery module, the battery pack, and the apparatus include the lithium-ion battery disclosed in this application, and therefore, have at least the same advantages as the lithium-ion battery, details of which are omitted here.

The lithium-ion batteries in Examples 1 to 15 were all manufactured according to the following methods.

(1) Preparation of a positive-electrode plate, including the following steps of:

mixing the positive-electrode active substance, a conductive agent Super P, and a binder polyvinylidene fluoride (PVDF) at a mass ratio of 97:1.4:1.6, adding the mixture into a solvent N-methylpyrrolidone (NMP), and stirring the mixture homogeneously with a vacuum blender to obtain a positive-electrode slurry having solid content of 77 wt %; homogeneously coating an aluminum foil of positive-electrode current collector with the positive-electrode slurry, and drying at a temperature of 85° C.; performing cold calendering, edge trimming, slicing, and slitting, and finally, drying again for 4 hours under vacuum condition at 85° C., to obtain a positive electrode plate.

preparing an inorganic dielectric layer on at least one membrane surface of the positive-electrode plate prepared above by performing a plasma-assisted thermal evaporation and deposition process. In such a process, a heating source was an electron beam, a heating target was a corresponding simple element (such as Al, Si, and Mg) other than oxygen in the inorganic layer. Under a vacuum condition, the temperature of the substrate was controlled lower than 100° ° C., by using an oxygen-containing activation gas (such as oxygen, ozone, oxygen ion, nitric oxide, nitrogen dioxide, carbon dioxide, and water vapor) as a reactive gas. By adjusting a heating current (50 Å~300 A), a vacuum degree of a process chamber ($10^{-1}$~$10^{-3}$ Pa), an oxygen flux (100 sccm~2000 sccm), a plasma power (300 W~600 W), and a process time, a speed of deposition of the inorganic layer on the surface of the positive-electrode plate was adjusted; and the thickness, components, and a micromorphology of the inorganic layer were further adjusted.

Specific parameters of the positive-electrode plates in Examples 1 to 15 were shown in Table 1.

(2) Preparation of a negative-electrode plate, including the following steps of:

mixing the negative-electrode active substance, the conductive agent Super P, a thickener sodium CMC, and a binder SBR emulsion at a mass ratio of 96.4:1.5:0.5:1.6, adding the mixture into a solvent being deionized water, and stirring the mixture homogeneously with a vacuum blender to obtain a negative-electrode slurry having solid content of 54 wt %; homogeneously coating a copper foil of negative-electrode current collector with the negative-electrode slurry, and drying at a temperature of 85° C.; performing cold calendering, edge trimming, slicing, and slitting, and finally drying again for 12 hours under vacuum condition at 120° ° C., to obtain a negative electrode plate.

(3) Preparation of an electrolyte, including the following steps of:

using, as an organic solvent, a mixed solution of ethylene carbonate (EC), ethyl methyl carbonate (EMC), and diethyl carbonate (DEC) at a volume ratio of EC, EMC and DEC being 20:20:60; and dissolving, in an argon-atmosphere glovebox with a water content of less than 10 ppm, a fully dried lithium salt in the organic solvent, adding an additive, and mixing homogeneously to obtain an electrolyte, with a concentration of the lithium salt being 1 mol/L.

(4) Preparation of a separator, including the following steps of:

using, as a substrate, a 14 μm thick polyethylene film (PE), and coating the substrate with a 2 μm thick organic-inorganic particle composite coating, to form a separator.

(5) Preparation of a lithium-ion battery, including the following steps of:

stacking the positive-electrode plate, the separator, and the negative-electrode plate in sequence, while placing the separator between the positive-electrode plate and the negative-electrode plate to implement separation of the positive-electrode plate and the negative-electrode plate: winding into a rectangular bare core, welding a tab, loading the bare core into an aluminum laminated film package, baking the package at 80° ° C., to remove moisture, injecting the electrolyte into the package, and sealing the package: then performing processes including letting the package stand, and hot and/or cold calendering, formation (charging to 3.3V with a 0.02C constant current, and then charging to 3.6V with a 0.1C constant current), reshaping, capacity testing, to obtain a finished soft-package lithium-ion battery being 4.0 mm in thickness, 60 mm in width, and 140 mm in length.

Comparative Example 1

Example 2 was repeated, except that: no inorganic dielectric layer was disposed on the surface of the positive-electrode plate.

Comparative Example 2

Example 2 was repeated, except that the thickness of the inorganic dielectric layer on the surface of the positive-electrode plate was 1200 nm.

Comparative Example 3

Example 2 was repeated, except that the inorganic dielectric layer disposed on the surface of the positive-electrode plate was obtained by coating the positive-electrode plate with a slurry comprising a binder and alumina ceramic particles, followed by cold calendering and drying.

Specific parameters of the positive-electrode plates in Comparative Examples 1 to 3 were shown in Table 1.

TABLE 1

Parameters of positive-electrode plates in Examples 1 to 15 and Comparative Examples 1 to 3

| | Positive-electrode active substance | | | Inorganic dielectric layer | | | | Positive-electrode plate | | |
|---|---|---|---|---|---|---|---|---|---|---|
| | Type of active substance | D50 μm | BET m²/g | Material type | Thickness T (nm) | $D_1/T$ | Coverage form | Extension depth | Porosity of electrode plate | Resistance of electrode plate, ohm |
| Example 1 | NCM811 | 8.5 | 1.21 | Alumina | 50 | 0.50 | Discrete lamellae | 1/1200 | 30% | 2.0 |
| Example 2 | NCM811 | 11.5 | 0.54 | Alumina | 50 | 0.40 | Discrete lamellae | 1/1000 | 30% | 2.0 |
| Example 3 | NCM811 | 11.5 | 0.54 | Alumina | 100 | 0.20 | Discrete lamellae | 1/700 | 30% | 3.0 |
| Example 4 | NCM811 | 11.5 | 0.54 | Alumina | 200 | 0.10 | Discrete lamellae | 1/400 | 20% | 3.5 |
| Example 5 | NCM811 | 11.5 | 10.54 | Alumina | 600 | 0.03 | Discrete lamellae | 1/200 | 20% | 5.0 |
| Example 6 | NCM811 | 11.5 | 0.54 | Alumina | 1000 | 0.02 | Discrete lamellae | 1/20 | 15% | 7.0 |
| Example 7 | NCM811 | 15.4 | 0.35 | Alumina | 1000 | 0.04 | Discrete lamellae | 1/10 | 15% | 7.5 |
| Example 8 | NCM811 | 5.5 | 1.51 | Alumina | 1000 | 0.05 | Discrete lamellae | 1/5 | 15% | 8.0 |
| Example 9 | NCM811 | 11.5 | 0.54 | Alumina + titanium oxide | 300 | 0.07 | Discrete lamellae | 1/400 | 20% | 3.7 |
| Example 10 | NCM811 | 11.5 | 0.54 | Alumina + silicon oxide | 300 | 0.07 | Discrete lamellae | 1/400 | 20% | 3.8 |
| Example 11 | NCM811 | 11.5 | 0.54 | Alumina + aluminum nitride | 300 | 0.07 | Discrete lamellae | 1/400 | 20% | 4.2 |
| Example 12 | NCM811 | 8.5 | 1.21 | Alumina | 300 | 0.06 | Discrete lamellae | 1/600 | 20% | 3.6 |
| Example 13 | NCM811 | 10.3 | 0.89 | Alumina | 300 | 0.06 | Discrete lamellae | 1/500 | 20% | 3.8 |
| Example 14 | NCM811 | 14.6 | 0.42 | Alumina | 300 | 0.08 | Discrete lamellae | 1/300 | 25% | 4.3 |
| Example 15 | NCM811 | 11.5 | 0.54 | Alumina | 200 | 0.10 | Continuous lamellae | 1/400 | 20% | 4.5 |
| Comparative Example 1 | NCM811 | 11.5 | 0.54 | / | / | 1 | / | / | 20% | 1.0 |
| Comparative Example 2 | NCM811 | 11.5 | 0.54 | Alumina | 1200 | 0.01 | Discrete lamellae | 1/9 | 15% | 9.0 |
| Comparative Example 3 | NCM811 | 11.5 | 0.54 | Alumina particles + binder coating | 3000 | | Continuous lamellae | / | 30% | 10.0 |

Tests for the lithium-ion battery were described as follows.

(1) Test of gas generation in a lithium-ion battery stored at a high temperature of 80° C. including the following steps of:

charging, at 25° C., the lithium-ion battery to a 4.2V voltage by using a 0.5C-rate constant current, and then charging the battery to a 0.05C-rate current by using a 4.2V constant voltage: measuring an initial volume of the lithium-ion battery at this time by using a drainage method, and recording the measured volume as $V_0$; storing the lithium-ion battery in an 80° C. thermostat chamber for 360 hours; taking the battery out upon completion of the storage, and measuring the volume of the lithium-ion battery again by using the drainage method, and recording the measured volume as $V_1$. Each measurement was performed by testing 15 lithium-ion batteries and taking the average value.

Volume expansion rate (%) of a lithium-ion battery after being stored for 360 hours at 80° C.=$(V_1-V_0)/V_0 \times 100\%$.

(2) Test of high-temperature cycling performance of a lithium-ion battery at 45° C., including the following steps of:

charging, at 45° C., the lithium-ion battery to a 4.2V voltage by using a 1C-rate constant current, and then charging the battery to a 0.05C-rate current by using a 4.2V constant voltage; and then discharging the battery to a 2.8V voltage by using a 1C-rate constant current, thereby completing a cycle of charge and discharge. The discharge capacity at this time was the discharge capacity after an initial cycle. Performing 1000 cycles of charge and discharge of the lithium-ion battery according to the above method. Each measurement was performed by testing 15 lithium-ion batteries and taking the average value.

Capacity retention rate (%) of the lithium-ion battery after 1000 cycles at 45° C.=the discharge capacity after 1000 cycles/the discharge capacity after the initial cycle×100%.

(3) Test of high-temperature storage performance of a lithium-ion battery at 60° ° C., including the following steps of:

charging, at 25° C., the lithium-ion battery to a 4.2V voltage by using a 0.5C constant current, and then charging the battery to a 0.05C-rate current by using a 4.2V constant voltage; and then discharging the battery to a voltage of 2.8V by using a 1C-rate constant current to obtain an initial discharge capacity $C_0$; subsequently, charging the lithium-ion battery to a 4.2V voltage by using a 0.5C-rate constant current, and then charging the battery to a 0.05C-rate current by using a 4.2V constant voltage; placing the fully charged lithium-ion battery into a 60° C., thermostat chamber to last for 180 days; and then taking out the lithium-ion battery and measuring a reversible capacity of the battery; and recording the measured capacity as $C_{180}$. Each measurement was performed by testing 15 lithium-ion batteries and taking the average value.

Capacity retention rate (%) of the lithium-ion battery after being stored for 180 days at 60° C.=$C_{180}/C_0 \times 100\%$.

(4) Test of direct-current internal resistance (DCR) growth rate of a lithium-ion battery after cycling and storage A DCR test of a lithium-ion battery was performed by a process including the following steps of:

adjusting, at 25° C., a state of charge (SOC) of the lithium-ion battery to 20% of the fully charged capacity, and discharging the battery for 10 s at a 0.3C rate, where the voltage before the discharge was recorded as $U_1$, and the voltage after the discharge was recorded as $U_2$. Therefore, the initial direct-current internal resistance of the lithium-ion battery $DCR_0=(U_1-U_2)/I$.

Testing, according to the above method, the direct-current internal resistance of the lithium-ion battery after 1000 cycles at 45° C., and the direct-current internal resistance of the lithium-ion battery after being stored for 180 days at 60° C., and calculating the DCR growth rate of the lithium-ion battery. Each measurement was performed by testing 15 lithium-ion batteries and taking the average value.

TABLE 2

Test results in Examples 1 to 15 and Comparative Examples 1 to 3

| | Volume expansion rate after storing for 360 hours at 80° C. | Capacity retention rate after 1000 cycles at 45° C. | DCR growth rate after 1000 cycles at 45° C. | Capacity retention rate after storing for 180 days at 60° C. | DCR growth rate after storing 180 days at 60° C. |
|---|---|---|---|---|---|
| Example 1 | 27.30% | 79.40% | 21.60% | 90.90% | 24.10% |
| Example 2 | 25.40% | 85.90% | 21.40% | 85.70% | 21.00% |
| Example 3 | 24.30% | 86.60% | 19.40% | 84.70% | 23.30% |
| Example 4 | 22.10% | 87.70% | 23.70% | 87.70% | 21.40% |
| Example 5 | 21.00% | 84.20% | 20.80% | 84.90% | 23.20% |
| Example 6 | 20.70% | 82.90% | 24.50% | 79.10% | 26.10% |
| Example 7 | 21.10% | 79.00% | 25.50% | 79.50% | 25.10% |
| Example 8 | 20.80% | 78.10% | 28.10% | 78.40% | 24.10% |
| Example 9 | 23.10% | 88.80% | 22.60% | 83.40% | 21.30% |
| Example 10 | 22.50% | 85.70% | 18.00% | 88.70% | 22.30% |
| Example 11 | 22.60% | 87.00% | 19.60% | 82.10% | 24.10% |
| Example 12 | 23.40% | 85.10% | 20.50% | 85.80% | 22.40% |
| Example 13 | 24.10% | 90.30% | 16.10% | 90.90% | 25.40% |
| Example 14 | 22.80% | 89.60% | 15.30% | 86.70% | 25.50% |
| Example 15 | 20.60% | 86.50% | 25.90% | 86.10% | 24.30% |
| Comparative Example 1 | 45.20% | 75.90% | 38.50% | 80.00% | 34.10% |
| Comparative Example 2 | 22.60% | 76.20% | 41.90% | 74.2% | 35.60% |
| Comparative Example 3 | 31.10% | 80.80% | 45.70% | 80.50% | 43.90% |

As can be learned from the above test results, in Examples 1 to 15 of this application, by disposing the inorganic dielectric layer containing no binder on the positive-electrode active substance layer and meanwhile maintaining the resistance of the positive-electrode plate of not higher than 8 ohms, the inorganic dielectric layer exhibited good electrochemical stability, and avoided direct contact between the highly oxidative positive-electrode active substance layer and the electrolyte. In addition, by disposing the inorganic dielectric layer on a macro positive-electrode plate surface, surface roughness of the active substance outside the positive-electrode plate was reduced, thereby effectively reducing an effective contact area between the highly oxidative positive-electrode active substance and the electrolyte. Therefore, side reactions of the electrolyte on the surface of the positive-electrode plate were suppressed, and the quantity of gas generated by decomposition of the electrolyte was reduced, thereby extending a storage life and a service life of the battery. In addition, the inorganic dielectric layer also served as an insulating interface between the positive-electrode plate and the separator, and prevented a separator polymer from oxidation and failure due to contact with the highly oxidative positive-electrode plate under a high voltage.

In Comparative Example 1, no inorganic dielectric layer was disposed on the surface of the positive-electrode active substance layer. During high-temperature cycling and storage, the surface of the positive-electrode plate was highly oxidative, and many side reactions of the electrolyte occurred on the surface of the electrode plate. Consequently, the volume expansion rate of the battery was relatively high, an internal impedance of the battery increased significantly, and the capacity retention rate decreased drastically.

In Comparative Examples 2 and 3, an inorganic dielectric layer or an inorganic particle coating that includes a binder was disposed on the surface of the positive-electrode active substance layer, and an interface of the positive-electrode plate was stabilized. However, the internal resistance of the battery system increased too much due to too high resistance of the positive-electrode plate. Consequently, the kinetic performance and the rating performance of the battery were deteriorated.

Only several embodiments of this application are described above, and shall in no way limit this application. Although this application is disclosed above with reference to the exemplary embodiments, the exemplary embodiments are not intended to limit this application. Any modifications or improvements, which may be made by a person skilled in the art by taking advantage of the foregoing technical content without departing from the scope of the technical solutions of this application, shall be treated as equivalents of this application, and shall fall within the scope of the technical solutions of this application.

What is claimed is:

1. A positive-electrode plate, comprising a positive-electrode current collector and at least one positive-electrode active substance layer disposed on a surface of the positive-electrode current collector, wherein
the positive-electrode active substance layer comprises a positive-electrode active substance represented by Formula (1):

$$Li_xNi_yCO_zM_kMe_pO_rA_m \qquad \text{Formula (1);}$$

in Formula (1), $0.95 \leq x \leq 1.05$, $0 \leq y \leq 1$, $0 \leq z \leq 1$, $0 \leq k \leq 1$, $0 \leq p \leq 0.1$, $y+z+k+p=1$, $1 \leq r \leq 2$, $0 \leq m \leq 2$, $m+r \leq 2$, M is one or two of Mn or Al, Me is one or more of Zr, Zn, Cu, Cr, Mg, Fe, V, Ti, Y, or Nb, and A is one or more of N, F, S, or Cl;

an inorganic dielectric layer is disposed on a surface of the at least one positive-electrode active substance layer that is away from the current collector, and the inorganic dielectric layer contains no binder; and a resistance R of the positive-electrode plate is not higher than 8 ohms, and the inorganic dielectric layer in the form of discrete lamellae covers a surface of positive-electrode active substance particles, and a depth H by which the inorganic dielectric layer extends inside the positive-electrode active substance layer in a thickness direction of the positive-electrode active substance layer is 1/1000 to 1/10 of a thickness of the positive-electrode active substance layer.

2. The positive-electrode plate according to claim 1, wherein the inorganic dielectric layer is formed of a plurality of nanoclusters that are closely stacked via intermolecular force.

3. The positive-electrode plate according to claim 2, wherein the average particle diameter $D_1$ of the nanoclusters is 5 nm~200 nm.

4. The positive-electrode plate according to claim 2, wherein an average particle diameter $D_1$ of the nanoclusters and a thickness T of the inorganic dielectric layer covering the surface of the positive-electrode active substance layer satisfy: $0.02*T \leq D_1 \leq 0.5*T$.

5. The positive-electrode plate according to claim 2, wherein the thickness T of the inorganic dielectric layer covering the surface of the positive-electrode active substance layer is 50 nm~1000 nm.

6. The positive-electrode plate according to claim 5, wherein the thickness T of the inorganic dielectric layer is 100 nm~600 nm.

7. The positive-electrode plate according to claim 5, wherein the thickness T of the inorganic dielectric layer is 200 nm~500 nm.

8. The positive-electrode plate according to claim 1, wherein the inorganic dielectric layer comprises at least one of aluminum oxides, AlO (OH), aluminum nitrides, aluminum fluorides, silicon oxides, silicon nitrides, silicon fluorides, titanium oxide, titanium nitrides, titanium fluorides, zinc oxides, zinc nitrides, zinc fluorides, magnesium oxides, magnesium nitrides, magnesium fluorides, zirconium oxides, zirconium nitrides, zirconium fluorides, calcium oxides, calcium nitrides, calcium fluorides, barium oxides, barium nitrides, or barium fluorides.

9. The positive-electrode plate according to claim 1, wherein the positive-electrode active substance layer further comprises a positive-electrode active substance represented by Formula (2):

$$Li_{1+z}Mn_cMe'_{2-c}O_{4-d}A'_d \qquad \text{Formula (2);}$$

in Formula (2), $-0.1 \leq z \leq 0.2$, $0 \leq c \leq 2$, $0 \leq d < 1$, Me' comprises one or more of Ni, Fe, Cr, Ti, Zn, V, Al, Mg, Zr, or Ce, and A' comprises one or more of S, N, F, Cl, Br, or I.

10. The positive-electrode plate according to claim 1, wherein a compacted density of the positive-electrode plate is 3.2 g/cm³~3.9 g/cm³, and a porosity of the positive-electrode plate is 2%~30%.

11. The positive-electrode plate according to claim 1, wherein an average particle diameter of the positive-electrode active substance is 5 μm~25 μm, and a specific surface area of the positive-electrode active substance is 0.3 $m^2/g$~0.8 $m^2/g$.

12. The positive-electrode plate according to claim 1, wherein the inorganic dielectric layer also covers inner walls of at least a part of pores inside the positive-electrode active substance layer.

13. The positive-electrode plate according to claim 1, wherein a thickness of the inorganic dielectric layer covering the inner walls of the pores inside the positive-electrode active substance layer gradually decreases from the outermost to the inside in a thickness direction of the positive-electrode active substance layer.

14. A lithium-ion battery, comprising: the positive-electrode plate according to claim 1; a negative-electrode plate; a separator disposed between the positive-electrode plate and the negative-electrode plate; and an electrolyte, wherein the electrolyte comprises a lithium salt and an organic solvent.

15. The lithium-ion battery according to claim 14, wherein a second inorganic dielectric layer containing no binder is disposed on a surface of the negative-electrode plate, and a resistance of the negative-electrode plate is not higher than 3 ohms.

16. A battery module, comprising the lithium-ion battery according to claim 14.

17. A battery pack, comprising the battery module according to claim 16.

18. An apparatus, comprising the lithium-ion battery according to claim 14, wherein the lithium-ion battery is used as a power supply of the apparatus.

* * * * *